United States Patent [19]
Grosseau

[11] 3,915,508
[45] Oct. 28, 1975

[54] ANTI-LOCKING SYSTEMS FOR VEHICLE BRAKES
[75] Inventor: Albert Grosseau, Chaville, France
[73] Assignee: Soc. Anon. Automobiles Citroen, Paris, France
[22] Filed: Oct. 15, 1973
[21] Appl. No.: 406,582

[52] U.S. Cl. .......... 303/21 BE; 188/181 C; 303/20
[51] Int. Cl.² .......................................... B60T 8/10
[58] Field of Search...... 188/181 C; 235/150.2, 177; 303/20, 21; 307/233 B; 317/5; 318/601, 52; 324/161; 340/53, 62, 263, 146.2

[56] References Cited
UNITED STATES PATENTS

| | | | |
|---|---|---|---|
| 3,450,444 | 6/1969 | Ballard | 303/21 EB |
| 3,583,773 | 6/1971 | Steinbrenner et al. | 303/21 EB |
| 3,653,727 | 4/1972 | Kullberg et al. | 303/21 P |
| 3,663,070 | 5/1972 | Scharlack | 303/21 P |
| 3,680,655 | 8/1972 | Beyerlein et al. | 317/5 X |
| 3,701,568 | 10/1972 | Lewis et al. | 303/21 P |
| 3,709,565 | 1/1973 | Jonason et al. | 303/21 BE |
| 3,735,200 | 5/1973 | Kritz | 303/21 BE X |
| 3,806,205 | 4/1974 | Hida et al. | 303/21 P X |

Primary Examiner—Trygve M. Blix
Assistant Examiner—Stephen G. Kunin
Attorney, Agent, or Firm—Eyre, Mann & Lucas

[57] ABSTRACT

An anti-locking braking device for a vehicle wheel comprises apparatus for producing a first pulsed electrical signal whose pulse frequency represents the rotational speed of the wheel and apparatus for producing a second pulsed electrical signal representing a preset fraction of the vehicle speed. Digital apparatus are provided for comparing the first and second signals to thereby produce as a function of their difference, a pulsed control signal for driving an electrovalve of proportional type which is arranged to limit the maximum braking force applied to the wheel.

5 Claims, 4 Drawing Figures speed of the wheel displayed at time t and the speed of the vehicle produced at time $t-1$ ($t$ and $t-1$ corresponding to the transmission of two consecutive clock pulses). If $V_t$ is greater than, or equal to $W_{t-1}$, the generator issues $W_t$ equal to $V_t$, but if $V_t$ is smaller than $W_{t-1}$, the generator issues $W_t$ at most equal to $W_{t-1}$; if this condition is maintained each time a given number $x$ of clock pulses has elapsed, $W_t$ is decreased by a value $y$ such that the ratio $x/y$ represents the maximum possible deceleration of the vehicle.

An interesting simplification is introduced by selecting the frequency of 100 Hertz for the clock and getting the pick-up 9 to produce such pulses per wheel revolution such that the numbers displayed at the counter 12 correspond to the wheel speed expressed in meters per second. Under these conditions, it will be advantageous to select $x=10$ and $y=1$, which gives a deceleration limit of 10m/sec² very close to the maximum possible value.

The generator 21 can comprise a shift register whose first output is the number being entered into the register and whose second output is the number being shifted from the register, both the outputs of the register being connected to a comparator. A logic circuit is connected to the register, to the comparator and to the clock 11 to control operation of the generator.

FIG. 3 shows an example of execution of the converter 18 which supplies, at the frequency of the clock 11, gating pulses of variable width as a function of the digital datum displayed by the differential counter 16. It has been assumed here that the signal from the counter 16 could assume four binary values 00,01,10 and 11. In this case, the converter includes a frequency multiplier 25 which multiplies by three the frequency of the pulses of the clock 11, a two-bit memory 26 which is connected to the multiplier 25 in such a way as to receive count-down pulses coming from this multiplier and a transfer device 27 which connects the memory 26 to the counter 16 and is controlled by the clock 11 in such a way as to transfer to the memory 26 the number entered in the counter 16, at each clock pulse. The outputs of the memory 26 are connected to an OR gate 39 which supplies a signal as long as at least one bit of the memory is equal to 1.

Thus, if T is the duration between two clock pulses and if the counter output is the binary number 10, for example, at the time $t$, the number 01 will be entered in the memory 26 at the time $t+T/3$ and the number 00 will be entered in it at the time $t+2T/3$, which will bring about a cancellation of the output signal. The gating pulse from the converter 18 will be supplied during two thirds of the interval T separating two clock pulses. Therefore, the converter 18 has supplied an output signal whose mean amplitude is proportional to the digital input from the counter 16.

Generally speaking, if the signal of the counter 16 can assume $2^k$ values, the multiplier 25 will have to multiply the clock frequency by $2^k-1$ and the memory 26 will have to be of $k$ bits.

In the method of execution of FIG. 4, each wheel of the vehicle comprises its own pick-up 9a, 9b, 9c or 9d which is connected via a pulse shaping circuit 10a, 10b, 10c or 10d to a counter 11a, 11b, 11c or 11d. The various counters are connected to a logic block 28 which compares the four numbers $V_1$, $V_2$, $V_3$ and $V_4$ indicated by the counters and supplies to the generator 21 the greatest of these four numbers, the latter being the nearest to the speed W of the vehicle at the time of deceleration; as in the form of execution of FIG. 2, the generator 21 is followed by a logic circuit 15 which supplies a number $\alpha W$.

Each wheel speed $V_1$, $V_2$, $V_3$ and $V_4$ is compared with the number $\alpha W$. This comparison being identical for the four wheels, there will be considered only the comparison relating to only one of them which will be called V.

The differential counter 16 receives the numbers $\alpha W$ and V and supplies a digital indication which is the difference between the value supplied by the circuit 15 and the value V. This counter 16 is connected to the inlet of a shift register 29, one of whose outputs is the number being shifted from the register and another of whose outputs is the number being shifted into the register. A differential counter 30 has its inputs connected to the two outputs of the shift register 29 and its output connected to a shift register 31. The two outputs of this register are connected to the inputs of a second differential counter 32, the output of which is connected to a memory 33.

At the instant $t-1$, the counter 16 supplies the difference $\epsilon_{t-1} = \alpha W_{t-1} - V_{t-1}$ which is input into the shift register 29. At the time $t$, the counter 16 supplies a new value of $\epsilon_t$. This takes the place of $\epsilon_{t-1}$ in the shift register 29 and $\epsilon_{t-1}$ is shifted.

The counter 30 produces the difference $\epsilon_t - \epsilon_{t-1}$ which is entered into the shift register 31. This new difference corresponds by analogy to $d\epsilon/dt$; similarly the counter 32 produces the difference $(\epsilon_t - \epsilon_{t-1}) - (\epsilon_{t-1} - \epsilon_{t-2})$ which corresponds by analogy to $d^2\epsilon/dt2$.

Moreover, an adder counter 34 has one of its inputs connected to the shift register 29 and another input connected to one of the outputs of a shift register 35 of which the input is connected to the output of the counter 34. Similarly, an adder counter 36 has one of its inputs connected to the other output of the shift register 35 and its other input connected to one of the outputs of a shift register 37 of which the input is connected to the other output of the counter 36.

At moment O, the counter 34 sends the signal $\epsilon_0$ to the shift register 35. At moment 1, the value $\epsilon_0$ is shifted and the counter 34 produces the signal $\epsilon_0 + \epsilon_1$; similarly, at moment 2 it produces the signal $\epsilon_0 + \epsilon_1 + \epsilon_2$. It is thus seen that at moment $t$, the counter 34 sends to the shift register 35 a signal which is transferred to the counter 36 and represents by analogy:-

$$\int_o^t \epsilon\, dt = \epsilon_t + \int_o^{t-1} \epsilon\, dt.$$

Similarly, the counter 36 produces the signal:-

$$\iint_o^t \epsilon\, dt dt = \int_o^t \epsilon\, dt + \iint_o^{t-1} \epsilon\, dt dt.$$

The signals coming from the shift 29, 31, 35 and 37 as well as from the memory 33 are sent to a logic matrix 38. The latter is programmed as a function of the parameters of the vehicle to supply, at the output, a number between, for example, 0 and 7 or, more generally, between 0 and $2^k-1$, which is a function of the value of each of the inputs. This number is transferred to the converter 18 which includes a memory with $n$ bits and controls the winding 19 through the amplifier 20.

The logic matrix 38 may comprise logic circuitry and a ferrite memory. The logic produces as a function of the data $\epsilon$, $d\epsilon/dt$ ... $\int \epsilon\, dt$ ... the address of a number in memory; it is this number that is transferred into the memory of the converter. For a division in 7 of the clock period, the numbers having then 3 bits, the memory has 3 matrix planes.

ANTI-LOCKING SYSTEMS FOR VEHICLE BRAKES

BACKGROUND OF THE INVENTION

1. Field of the invention

The invention relates to means for controlling the braking of at least one wheel of a vehicle rolling on the ground, for example an aircraft or a motor vehicle, which prevents the locking of the wheel if the braking effort is too considerable.

2. Description of the Prior Art

Anti-locking devices are known which comprise means for producing an electric signal according to the sliding on the ground of the wheel to be braked, and means such as to decrease the pressure operating the brakes members when such sliding reaches a predetermined value.

In these devices, the sliding is determined by comparing the speed of the wheel to be braked with the speed of the vehicle, and the signal obtained is used to drive an electro-valve which limits the maximum pressure which can be applied to the brake when the speed ratio falls below a certain threshold, the optimum value of which is of the order of 0.8.

SUMMARY OF THE INVENTION

An object of the invention is to provide an improved anti-lock brake.

According to the invention there is provided an anti-locking braking device for controlling the braking of at least one wheel of a vehicle; means for producing a first pulsating electric signal the frequency of which is proportional to the speed of rotation of the wheel, means for producing a second pulsating electric signal representing a predetermined fraction of the speed of the vehicle, digital comparing means for comparing the first and the second signal and issuing an electrical sliding error signal which is a function of the difference between the speed of the wheel and the predetermined fraction of the speed of the vehicle, pressure-operated braking means for said wheel, control means for controllably limiting the maximum pressure that can be applied to the braking means to brake said wheel, and means for producing as a function of said error signal a pulsating control signal driving the control means whereby to reduce the pressure applied to the braking means in the event of wheel slip exceeding a predetermined value.

BRIEF DESCRIPTION OF THE DRAWINGS

A description is given hereinunder, as a nonlimitative example, of a braking system embodying the invention, with reference to the attached drawings, in which.

DESCRIPTION OF THE PREFERRED EMBODIMENTS

Figure 1:
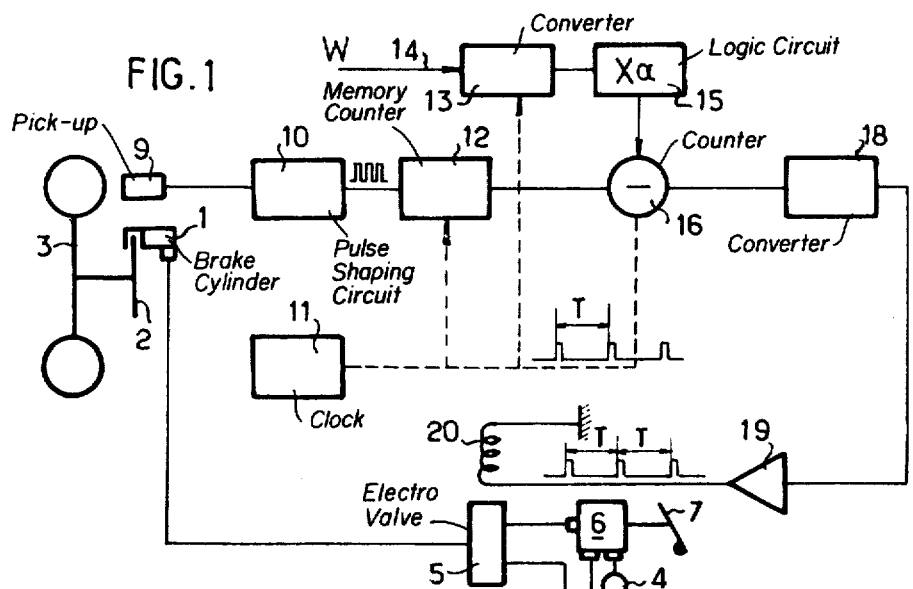
FIG. 1 is a diagram of a first form of the system.

In FIG. 1 there is seen a brake cylinder 1 which cooperates in the usual manner with a disk 2 rigid with a wheel 3. The cylinder 1 may be connected with a pressure source 4 through an electro-valve 5 and a metering valve 6 which is controlled by the brake pedal 7. A tank 8 is connected with the inlet of the pressure source 4.

In the vicinity of the wheel 3 there is disposed a pick-up 9, for example of electro-magnetic type, which supplies pulses the frequency of which is a function of the speed of the wheel. The pick-up 9 is connected to the inlet of a pulse shaping circuit 10.

A clock 11 supplies drive pulses at a constant frequency, for instance at 100 Hertz. This clock is connected to a memory counter 12 which is connected to the output of the circuit 10 and counts the pulses received from the pick-up 9 in the interval between two clock pulses, each clock pulse resetting the counter to zero to prepare it for a new counting. The indication of the counter is thus representative of the speed V of the wheel 3.

A converter 13, controlled by the clock 11, received at 14 an electric signal representing the speed W of the vehicle, measured in any way, and transforms it into impulses the frequency of which is a function of this speed. This converter is connected with a logic circuit 15 which supplies, between two clock pulses, a number $\alpha W$ of pulses related to the number W coming from the converter by a ratio $\alpha$, of less than 1, which may be constant and equal (0.8 for example) or variable according to W. The number $\alpha W$ represents the optimum speed of the wheel 3, relative to the reduced speed, and corresponds to a certain degree of sliding.

A differential counter 16, also controlled by the clock 11 so as to be reset to zero at each clock pulse, has its inputs connected to the counter 12 and to the logic circuit 15 in such a way as to supply a digital indication which is the difference between the digital value supplied by the circuit 15 and that displayed by the counter 12.

The counter 16 is connected to a converter 18 which supplies, when the digital value displayed by the counter 16 is positive, an electric signal representing this value. The converter 18 is connected by an amplifier 19 to the winding 20 of the electro-valve.

When the value displayed by the counter 12 is below the indication supplied by the logic circuit 15, that is to say when the sliding of the wheel 3 is greater than the optimum value, the converter 18 supplies an electric signal which is a function of the difference of the two digital signals and drives the electro-valve 5 in such a way as to close this valve according to the magnitude of the signal. The result is a reduction of the braking, and therefore an increase of the speed of the wheel 3 until the wheel has resumed the speed corresponding to its optimum sliding.

The electro-valve 5 is preferably of proportional type, that is to say it produces on the braking circuit a lowering of pressure proportional to the mean intensity of the current going through its winding 20. It may, for example, be of the type described in French Pat. No. 71 21414 filed by the Applicants on June 9 1971. In French Pat. No. 71.21414 there is described an electrically operated valve comprising a distributor having a slide operative to selectively place a fluid actuated device in communication with a source of pressurized fluid, or with a fluid outlet. As there described, the slide is actuated by an electrodynamic motor in response to a control signal whereby the fluid pressure in the device is dependent on the signal.

Figure 2:
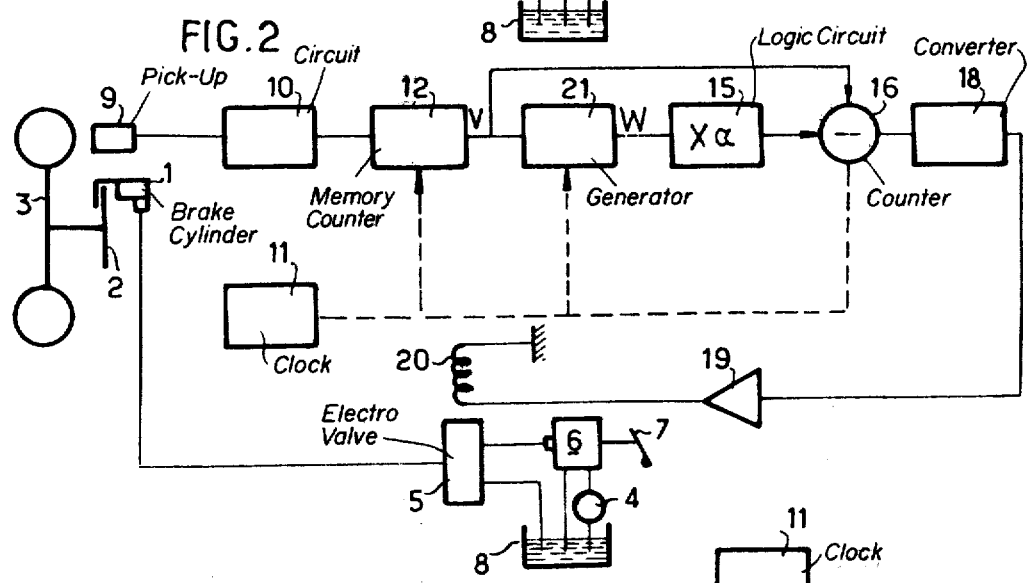
FIG. 2 is a diagram of a second form of the system.
Figure 3:
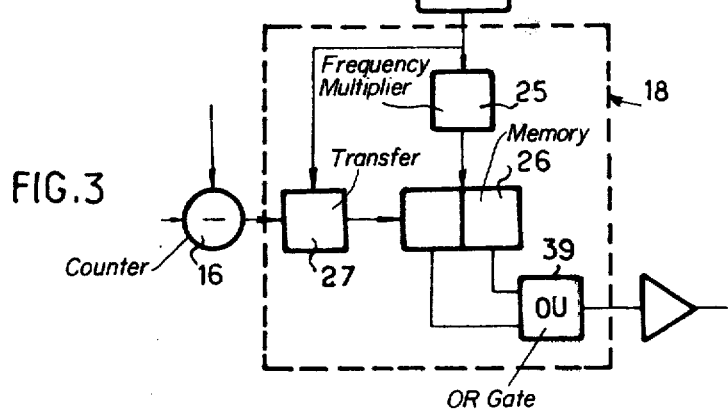
FIG. 3 is the diagram of a converter which may be used in the system of FIG. 2.
Figure 4:
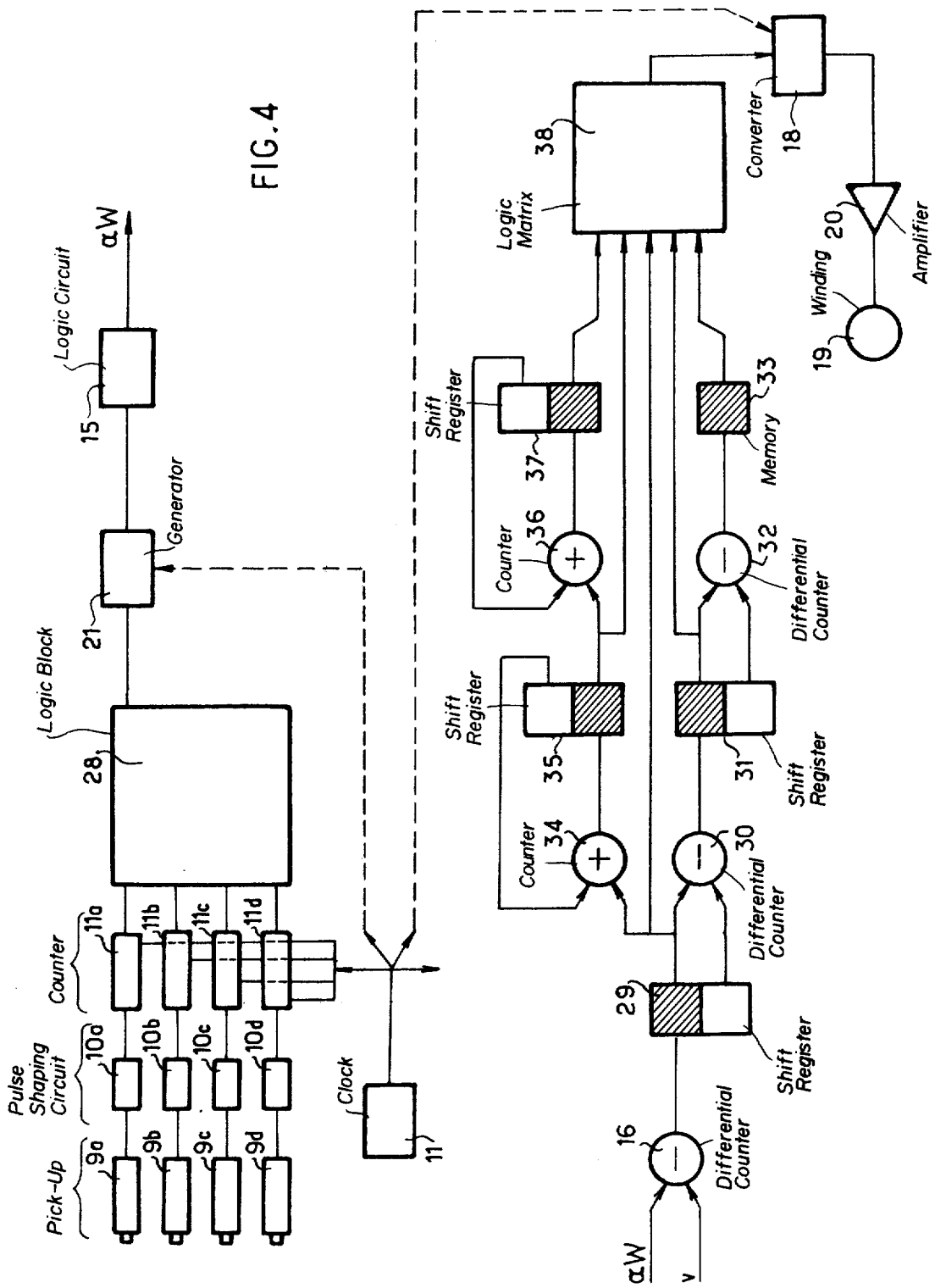
FIG. 4 is the diagram of a third form of the system.

In the system of FIG. 2, a generator 21 produces the speed W of the vehicle from the speed of the wheel 3, comparing $V_t$ and $W_{t-1}$ representing respectively the As a result of these last provisions, the error signal anticipates the variations, whatever their direction, of the discrepancy between the speed of the wheel braked and the speed which it would have on optimum sliding; the braking pressure is thus controlled to maintain in stable manner and without inertia the optimum sliding rate of the wheel, whatever the adherence conditions may be.

In the event of the device having to control, not the braking of each wheel but the combined braking of the two wheels on each axle, the logic block 28 supplies a number equal to the smaller of the two numbers $V_1$ and $V_2$ representing the speeds of the front wheels and a number equal to the smaller of the two numbers $V_3$ and $V_4$ representing the speeds of the rear wheels, and it is those numbers that are compared with the number $\alpha W$ in the counter 16.

The present invention is not to be regarded as restricted to the methods of execution described and represented, but covers all alternatives falling within the scope of the appended claims.

I claim:

1. A anti-locking braking device for controlling the braking of at least one wheel of a vehicle;

means for producing a first pulsating electric signal the frequency of which is proportional to the speed of rotation of the wheel, means for producing a second pulsating electric signal representing a predetermined fraction of the speed of the vehicle, digital comparing means for comparing the first and the second signals and issuing an electrical wheel slip error which is a function of the difference between the speed of the wheel and the predetermined fraction of the speed of the vehicle, pressure-operated braking means for said wheel, control means for controllably limiting the maximum pressure that can be applied to the braking means to brake said wheel, and means for producing as a function of said error signal a pulsating control signal driving the control means to reduce the pressure applied to the braking means in the event of wheel slip exceeding a predetermined value, and further comprising a clock generating pulses at a fixed frequency lower than the minimum frequency of said first and second signals, comparison means comprising counting means counting the number of pulses of the first and second signals between two consecutive clock pulses and producing a digital error signal which is a function of the difference between the number of pulses of the first signal and that of the second, and said means for producing the control signal from the digital error signal comprising a converter supplying at each clock pulse a pulsed signal the duration of which is a function of the digital error signal.

and further comprising a logic circuit programmed to supply a pilot number which is a function of the difference between the number of pulses of the first and that of the second signal arranged to drive said converter, the pilot number lying between zero and a constant given value, the converter issuing at each clock pulse a signal the length of which is a fraction of the period of the clock pulses equal to the ratio of the pilot number to the given value.

2. A braking device according to claim 1, in which the converter comprises a frequency multiplier arranged to multiply by $2^n-1$ the frequency of the clock pulses, a memory with $n$ bits connected with the multiplier, a transfer device which is controlled by the clock and connects the memory to said counting means, and an OR gate which is connected to the memory to issue a signal as long as at least one bit of the latter is equal to 1.

3. A anti-locking braking device for controlling the braking of at least one wheel of a vehicle;

means for producing a first pulsating electric signal the frequency of which is proportional to the speed of rotation of the wheel, means for producing a second pulsating electric signal representing a predetermined fraction of the speed of the vehicle, digital comparing means for comparing the first and the second signals and issuing an electrical wheel slip error signal which is a function of the difference between the speed of the wheel and the predetermined fraction of the speed of the vehicle, pressure-operated braking means for said wheel, control means for controllably limiting the maximum pressure that can be applied to the braking means to brake said wheel, and means for producing as a function of said error signal a pulsating control signal driving the control means to reduce the pressure applied to the braking means in the event of wheel slip exceeding a predetermined value, and further comprising a clock generating pulses at a fixed frequency lower than the minimum frequency of said first and second signals, comparison means comprising counting means counting the number of pulses of the first and second signals between two consecutive clock pulses and producing a digital error signal which is a function of the difference between the number of pulses of the first signal and that of the second, and said means for producing the control signal from the digital error signal comprising a converter supplying at each clock pulse a pulsed signal the duration of which is a function of the digital error signal, and in which said means for producing said second signal comprise a generator which receives a numerical signal representing the speed of the vehicle and transmits said numerical signal without alteration to said means of comparison if this signal increases or remains constant, but imposes upon said second signal a maximum reduction when said second signal decreases and a logic circuit which is connected to the generator and multiplies the signal received from the latter by a factor of less than one, and in which the generator comprises a shift register having a first output of a number being entered into the register and a second output of a number being shifted from the register, a comparator to which both outputs of the shift register are connected, and a logic circuit connected to the shift register, the comparator and the clock.

4. A anti-locking braking device for controlling the braking of at least one wheel of a vehicle;

means for producing a first pulsating electric signal the frequency of which is proportional to the speed of rotation of the wheel, means for producing a second pulsating electric signal representing a predetermined fraction of the speed of the vehicle, digital comparing means for comparing the first and the second signals and issuing an electrical wheel slip error signal which is a function of the difference between the speed of the wheel and the predetermined fraction of the speed of the vehicle, pressure-operated braking means for said wheel, control means for controllably limiting the maximum prressure that can be applied to the braking means to brake said wheel, and means for producing as a function of said error signal a pulsating control signal driving the control means to reduce the pressure applied to the braking means in the event of wheel slip exceeding a predetermined value, and further comprising a clock generating pulses at a fixed frequency lower than the minimum frequency of said first and second signals, comparison means comprising counting means counting the number of pulses of the first and second signals between two consecutive clock pulses and producing a digital error signal which is a function of the difference between the number of pulses of the first signal and that of the second, and said means for producing the control signal from the digital error signal comprising a converter supplying at each clock pulse a pulsed signal the duration of which is a function of the digital error signal, and further comprising means for differentiating said digital control signal, and a logic matrix which receives the digital control signal and the differentiated signal and is connected to said converter.

5. A anti-locking braking device for controlling the braking of at least one wheel of a vehicle;

means for producing a first pulsating electric signal the frequency of which is proportional to the speed of rotation of the wheel, means for producing a second pulsating electric signal representing a predetermined fraction of the speed of the vehicle, digital comparing means for comparing the first and the second signals and issuing an electrical wheel slip error signal which is a function of the difference between the speed of the wheel and the predetermined fraction of the speed of the vehicle, pressure-operated braking means for said wheel, control means for controllably limiting the maximum pressure that can be applied to the braking means to brake said wheel, and means for producing as a function of said error signal a pulsating control signal driving the control means to reduce the pressure applied to the braking means in the event of wheel slip exceeding a predetermined value, and further comprising a clock generating pulses at a fixed frequency lower than the minimum frequency of said first and second signals, comparison means comprising counting means counting the number of pulses of the first and second signals between two consecutive clock pulses and producing a digital error signal which is a function of the difference between the number of pulses of the first signal and that of the second, and said means for producing the control signal from the digital error signal comprising a converter supplying at each clock pulse a pulsed signal the duration of which is a function of the digital error signal, and further comprising means for integrating said digital control signal when it is positive, and a logic matrix which receives the digital control signal and the integrated signal.

* * * * *

UNITED STATES PATENT OFFICE
CERTIFICATE OF CORRECTION

PATENT NO. : 3,915,508
DATED : October 28, 1975
INVENTOR(S) : Albert Grosseau

It is certified that error appears in the above-identified patent and that said Letters Patent are hereby corrected as shown below:

Col. 4, Line 53: "shift 29, 31, 35" should read --shift registers 29, 31, 35--

Col. 5, Line 34, Claim 1: "slip error which" should read --slip error signal which--

Signed and Sealed this twenty-fourth Day of February 1976

[SEAL]

Attest:

RUTH C. MASON
Attesting Officer

C. MARSHALL DANN
Commissioner of Patents and Trademarks